2,842,474

PROCESS FOR PREPARING A COPOLYMER OF 3 - METHYLENE - 1 - CYCLOBUTENE AND ANOTHER ETHYLENICALLY UNSATURATED MONOMER AND THE COPOLYMER

Burt Carlton Pratt, Wilmington, Del., assignor to E. I. du Pont de Nemours and Company, Wilmington, Del., a corporation of Delaware No Drawing. Application August 16, 1955
Serial No. 528,820

16 Claims. (Cl. 154—140)

This invention relates to polymeric materials. More particularly, it relates to a new class of readily crosslinkable addition copolymers of methylenecyclobutene with ethylenically unsaturated monomers which form addition polymers.

Polymeric materials of various types are well known and many of these have achieved commercial success. The thermoplasticity of many of these polymers and their solubility in organic solvents make them of particular value in various applications. However, polymers that are insoluble in organic solvents and have high softening points or are even infusible, are desired for use in certain applications. Heretofore, such inert and infusible polymers have been obtained by crosslinking preformed linear polymers by the use of a separate crosslinking agent or by methods involving the evolution of volatile by-products during the crosslinking step. However, these methods have various disadvantages, and it is very desirable to develop new types of linear polymers that are capable of being crosslinked to insoluble, infusible products without requiring the use of separate crosslinking agents or without generating volatile by-products during the crosslinking step.

It is an object of this invention to provide novel linear polymers which can be crosslinked readily without separate crosslinking agents and without generating volatile by-products. Another object is to provide a process for preparing crosslinked polymers. A further object is to provide novel crosslinked polymers. Other objects of the invention will become apparent from the specification and claims.

Addition polymers having valuable crosslinking characteristics are provided by this invention. These novel polymers are copolymers of 3-methylene-1-cyclobutene and an ethylenically unsaturated monomer capable of undergoing addition polymerization, containing from 1% to 45%, by weight, of polymerized methylenecyclobutene. In these methylenecyclobutene copolymers with another ethylenically unsaturated monomer, from 1% to 45% by weight of the structural units are polymerized methylenecyclobutene having at least one of the annular carbons of each four-carbon ring in the main chain of atoms extending along the polymer structure.

These addition copolymers are crosslinked by simply heating them to a temperature of between 100° and 325° C. The crosslinking takes place readily in this temperature range. The exact time required to crosslink the polymers is dependent on the particular temperature being employed as well as on the composition of the copolymer. At temperatures of 100–150° C., copolymers containing the higher proportions of methylenecyclobutene units, i. e., 30–45% methylenecyclobutene units by weight, require more than five minutes to become crosslinked. At about 170–180° C., about five minutes' heating is usually sufficient, while at temperatures of 200–325° C. crosslinking is accomplished in less than five minutes. However, when the copolymer contains only a small proportion of methylenecyclobutene units, longer times or higher temperatures are generally required. At the lower temperatures mentioned above, polymers containing very small proportions, e. g., 1–10% by weight of methylenecyclobutene units, in general require proportionally longer times of heating.

The copolymers of this invention can be prepared by conventional addition polymerization methods from mixtures of methylenecyclobutene and any ethylenically unsaturated monomer capable of undergoing addition polymerization. Thus, methylenecyclobutene can be copolymerized with one or more other addition polymerizable ethylenically unsaturated compounds by emulsion, bead, bulk, and solution methods in the presence of an addition polymerization initiator. The addition polymerization initiator can be of the free radical-liberating type, of the coordination type, or of the ionic type. These initiators are used in conventional quantities, amounts ranging from 0.01% to 10% or more, based on the weight of comonomers, being operable. The proportions of methylenecyclobutene and the other copolymer monomer can vary widely, the exact proportions of reactants employed being dependent on the particular monomers being used and the proportion of methylenecyclobutene units desired in the copolymer. The amount of methylenecyclobutene units in the polymer obtained from any given proportion of comonomers depends on the relative polymerization rates of the particular comonomers employed. Thus, when methylenecyclobutene is the most reactive monomer employed, copolymers containing a small amount of this material, e. g., 1–10% methylenecyclobutene units, can be obtained from monomer mixtures containing as little as 10% of methylenecyclobutene. On the other hand, when the other comonomer is the most reactive, it is sometimes necessary to employ a comonomer mixture containing up to 90% of methylenecyclobutene in order to obtain a copolymer containing 10% methylenecyclobutene units. When the methylenecyclobutene and the comonomer being used have approximately the same polymerization rates, the proportions of the comonomers employed are essentially the same as those of the proportions of the different monomer units desired in the final copolymer.

The temperature at which the copolymerization of the methylenecyclobutene with the other ethylenically unsaturated monomer is carried out can vary widely, depending on the particular monomers employed and the particular initiators being used, temperatures ranging from as low as −50° C. up to 150° C., or higher, being operable. Appreciable crosslinking of the copolymers during the preparation of crosslinkable copolymers can be avoided, in general, by carrying out the preparation of the copolymers at temperatures below 150° C. since higher temperatures cause more rapid crosslinking.

The methylenecyclobutene used in preparing the copolymers of this invention can be prepared as follows. Methyl 3-methylenecyclobutane-1-carboxylate (prepared by heating allene and methyl acrylate to about 200° C. is reacted with hydrazine hydrate to form the hydrazide of 3-methylenecyclobutane-1-carboxylic acid. This latter compound is then treated with sodium nitrite in a reaction medium consisting of aqueous hydrogen chloride and diethyl ether to form 3-methylenecyclobutane-1-carbonyl azide. This azide is heated in methanol under reflux to form methyl-N-(3-methylenecyclobutyl)urethane. Treatment of this urethane with sodium hydroxide gives 3-methylenecyclobutylamine, which is then converted to the quaternary ammonium salt with methyl iodide in the presence of sodium carbonate. Treatment of the quaternary ammonium salt with 40% aqueous sodium hydroxide at a temperature of 120–140° C. gives 3-methylene-1-cyclobutene.

The ethylenically unsaturated monomers copolymerized with methylenecyclobutene can be compounds of the grades commercially available for the preparation of polymers. Best results are obtained when the comonomers are of highest purity available.

This invention is illustrated further by the following examples in which the proportions of ingredients are expressed in parts by weight unless otherwise noted.

*Example I*

A mixture of about 0.4 part of 3-methylene-1-cyclobutene and 1.13 parts of styrene in a polymerization system composed of 10 parts of water, 0.1 part of sodium lauryl sulfate, 0.015 part of ammonium persulfate, and 0.0075 part of sodium bisulfite is placed in a reaction vessel which is then closed and agitated at about 40° C. during a period of 18 hours. The polymerization system is then poured into 300 parts of a saturated sodium chloride solution to coagulate the copolymer of 3-methylene-1-cyclobutene and styrene. The polymer is purified by dissolving it in benzene and reprecipitating it with methanol, and is then dried at 30–35° C. The infrared absorption spectrum given by this polymer is different from that given by polystyrene. On analysis this polymer is found to contain 91.13% C. and 8.08% H. On the basis of the hydrogen content this polymer contains 29% methylenecyclobutene units, by weight.

The methylenecyclobutene/styrene copolymer of this example is crosslinked by heating it for 2–3 minutes at 225° C. The crosslinked polymer is insoluble in benzene. The methylenecyclobutene/styrene copolymer of the example is capable of air drying. On standing in the presence of air for several days it becomes insoluble in benzene.

A liquid coating composition can be prepared by dissolving the methylenecyclobutene/styrene copolymer of Example I in a volatile solvent, e. g., benzene. If desired, a pigment, e. g., titanium dioxide, can be incorporated in the coating composition. The concentration of the composition is adjusted to provide a viscosity suitable for brushing, or spraying, as desired. After the composition is applied to a substrate, it is allowed to air dry, or is baked at a temperature of 100° to 325° C. to provide an insoluble coating.

*Example II*

A polymerization system composed of 4 parts of methylenecyclobutene, 9.3 parts of n-butyl methacrylate, 2 parts of sodium lauryl sulfonate, 0.10 part of ammonium persulfate, 0.075 part of sodium bisulfite, and 100 parts of deoxygenated distilled water is tumbled in a polymerization bottle in a thermostat bath at 40° C. for 4½ hours. The system is then poured into 792 parts of absolute methanol containing 0.15 part of hydroquinone and 60 parts of concentrated hydrochloric acid. The coagulated polymer is collected and, after drying at 35° C. in the vacuum oven under nitrogen, amounts to 10 parts. The polymer is rubbery and soluble in benzene. On analysis this copolymer of 3-methylene-1-cyclobutene and butyl methacrylate is found to contain 74.94, 75.01% C and 9.67, 9.72% H. On the basis of the carbon content, the copolymer is calculated to contain 36.5% by weight, of the methylenecyclobutene units. On the basis of oxygen content (calculated by difference) the copolymer contains 38.8% methylenecyclobutene units.

When a small sample of the methylenecyclobutene/butyl methacrylate copolymer is heated at 190–210° C. for 5 minutes on a hot stage melting point apparatus, it is rendered insoluble in benzene and does not even swell when kept under this solvent overnight.

*Example III*

A polymerization system consisting of 4 parts of methylenecyclobutene, 8.1 parts of acrylonitrile, 2 parts of sodium lauryl sulfonate, 0.15 part of ammonium persulfate, 0.075 part of sodium bisulfite, and 100 parts of deoxygenated distilled water is tumbled in a polymerization bottle at 40° C. for 4½ hours. The polymerization system is poured into 792 parts of absolute methanol containing 0.15 part of hydroquinone. The polymer is collected by filtration under nitrogen and is sucked as dry as possible on the filter, although because of its gelatinous consistency, it is not possible to remove all of the solvent. The gel is completely soluble in dimethylformamide. This gel is dried at 35° C. in a vacuum oven under a slow stream of nitrogen. The light tan, friable solid obtained amounts to 9.5 parts. It forms a cloudy solution in dimethylformamide, and it can be precipitated from such a solution by dilution with water.

A small sample of the unreprecipitated copolymer is heated for 3 minutes at 205° C. on a hot stage melting point apparatus and after this treatment is found to be insoluble in dimethylformamide and is not swollen after standing under that solvent overnight.

*Example IV*

A solution of 7 parts of lithium aluminum tetradecyl in 350 parts of pure, dry cyclohexane is stirred in a reaction vessel at room temperature in a nitrogen atmosphere. To this solution is added a solution of 1.25 parts of titanium tetrachloride in 2.65 parts of cyclohexane. Gaseous ethylene is then introduced into the reaction vessel. When a temperature rise indicates that polymerization is taking place, the reaction mixture is heated to 80° C. and a solution of 3 parts of 3-methylene-1-cyclobutene in 20 parts of cyclohexane is added dropwise. The addition of methylene-cyclobutene under a slight pressure of ethylene requires 4 hours and the polymerization is continued for 1 additional hour under slight ethylene pressure. The reaction mixture is cooled, catalyst is destroyed by adding 40 parts of methanol, and the polymer is isolated by pouring the contents of the flask into 400 parts of methanol with stirring. The polymer is separated by filtration, washed thoroughly with methanol, and dried. The yield of off-white solid polymer is 4.5 parts. The polymer is soluble in hot xylene but heat treatment at 220–240° C. for 5–10 minutes gives a product that is insoluble in boiling xylene. Insolubility after heat treatment indicates that cyclobutene rings in the polymer act as crosslinking groups.

In addition to the specific copolymers illustrated by the examples, the copolymers of this invention include copolymers of 3-methylene-1-cyclobutene with any ethylenically unsaturated monomer capable of undergoing addition polymerization. Such ethylenically unsaturated polymerizable compounds which are operable in the present invention include olefins, both aliphatic mono- and diolefins, e. g., ethylene, propylene, butylene, butadiene and isoprene; vinyl and vinylidene halides, e. g., vinyl fluoride and vinylidene chloride; vinyl esters, e. g., vinyl benzoate, vinyl acetate, vinyl laurate; vinyl ketones, e. g., ethyl vinyl ketone and methyl isopropenyl ketone; acrylic and methacrylic acids and their derivatives, such as esters, nitriles and anhydrides, e. g., ethyl acrylate, methyl methacrylate, methacrylonitrile, and methacrylic acid; butenedioic acids and their derivatives, e. g., maleic and fumaric acids, their esters, nitriles and anhydrides; and substituted ethylenes, e. g., trifluoroethylene, tetrafluoroethylene, chlorotrifluoroethylene, styrene and α-methylstyrene. Either singly or in combinations of two or more, these unsaturated compounds are useful for copolymerization with 3-methylene-1-cyclobutene to produce the copolymers of this invention. Ethylenically unsaturated monomers having at least one terminal methylene group and which undergo addition polymerization are preferred for copolymerization with 3-methylene-1-cyclobutene since the most satisfactory results with respect to yield and polymer quality are obtained when such compounds are used.

Various free radical-generating polymerization initiators can be used in preparing the copolymers of this invention. One class of such initiators which are especially useful are the peroxy polymerization initiators. Specific examples of these include the dialkyl peroxides, e. g., di-tert-butyl peroxide and diethyl peroxide; diacyl peroxides, e. g., diacetyl peroxide, dibenzoyl peroxide and dilauroyl peroxide; hydroperoxides, e. g., tert-butyl hydroperoxide; peracids, e. g., peracetic acid, perbenzoic acid and perphthalic acid; and the persulfates, e. g., ammonium persulfate and sodium persulfate.

Another type of free radical-generating polymerization initiator which is useful in the process of this invention is the azo type of polymerization initiator. Specific examples of suitable azo initiators include α,α'-azodiisobutyronitrile, 1,1'-azodicyclohexanecarbonitrile, dimethyl α,α'-azodiisobutyrate, α,α'-azodiisobutyramide, and α-(carbamylazo)-isobutyronitrile.

Instead of the free radical-generating initiators mentioned above, initiators of the coordination type can be used to prepare the methylenecyclobutene copolymers of this invention, particularly copolymers with terminally unsaturated olefins, e. g., ethylene. This type of initiator is exemplified by the reaction products of organometallic compounds with polyvalent metal halides. Especially effective initiators of this type are the condensation products of aluminum trialkyls or lithium aluminum tetraalkyls with titanium, vanadium or zirconium tetrachloride. A preferred example of this type of initiator is the condensation product of lithium aluminum tetra-n-decyl with titanium tetrachloride.

Another type of polymerization initiator which can be used is the ionic initiator, both anionic and cationic types being operable. Examples of suitable anionic initiators include the alkylmagnesium halides, and sodium and potassium amides. Specific examples of suitable cationic initiators include boron trifluoride and aluminum trichloride.

The ease with which the linear polymers of this invention crosslink makes them valuable in a wide variety of applications. The susceptibility of the cyclobutene ring to opening at moderately elevated temperatures to produce crosslinking of the polymer chain makes possible the use of relatively low molecular weight crosslinkable polymers in forming objects of the desired shape and then by simple heat treatment changing the shaped polymer to an insoluble solid polymer.

The crosslinkable polymers of this invention are particularly useful when incorporated in printing inks since such inks can be set very rapidly by heat treatment. This rapid setting of printing inks is an important factor in obtaining increased rates of printing on modern printing equipment. At the present time the rate of printing is controlled by the rate at which the ink sets on the printed sheet. Consequently, improvements in the rate of setting of the ink will serve to increase the rate at which the machines can be operated.

Other applications of particular importance in which the crosslinkable copolymers of this invention can be used include the formation of laminates and finishes which can be very rapidly set by heat alone after being formed into the desired shape, or after being coated on various surfaces. The polymers of this invention are also useful for the formation of fibers which can be crosslinked by heating to prevent shrinkage and to increase their solvent resistance.

Since many different embodiments of the invention may be made without departing from the spirit and scope thereof, it is to be understood that the invention is not limited by the specific illustrations except to the extent defined in the following claims.

What is claimed is:

1. An addition copolymer of 3-methylene-1-cyclobutene and another ethylenically unsaturated monomer, said copolymer containing from 1% to 45% by weight of polymerized methylenecyclobutene.

2. A methylenecyclobutene copolymer with another ethylenically unsaturated monomer, the structural units of the copolymer forming a main chain of atoms extending along the polymer structure with from 1% to 45% by weight of the structural units being polymerized methylenecyclobutene having at least one of the annular carbons of each four-carbon ring in the main chain of atoms.

3. An addition copolymer of 3-methylene-1-cyclobutene and another ethylenically unsaturated monomer, having at least one terminal methylene group, said copolymer containing from 1% to 45% by weight of polymerized methylenecyclobutene.

4. A copolymer of 3-methylene-1-cyclobutene and styrene containing from 1% to 45% by weight of polymerized methylenecyclobutene.

5. A copolymer of 3-methylene-1-cyclobutene and butyl methacrylate containing from 1% to 45% by weight of polymerized methylenecyclobutene.

6. A copolymer of 3-methylene-1-cyclobutene and acrylonitrile containing from 1% to 45% by weight of polymerized methylenecyclobutene.

7. The process for preparing a crosslinked polymer which comprises heating, to a temperature between 100° and 325° C. until crosslinking has occurred, a crosslinkable copolymer of 3-methylene-1-cyclobutene with an other ethylenically unsaturated monomer, said copolymer containing from 1% to 45% by weight of polymerized methylenecyclobutene.

8. The process for preparing a crosslinked polymer which comprises heatng, to a temperature between 100° and 325° C. until crosslinking has occurred, a crosslinkable methylenecyclobutene copolymer with another ethylenically unsaturated monomer, from 1% to 45% by weight of the structural units being polymerized methylenecyclobutene having at least one of the annular carbons of each four-carbon ring in the main chain of atoms extending along the polymer structure.

9. The process for preparing a crosslinked polymer which comprises heating to a temperature between 100° and 325° C. until crosslinking has occurred, a crosslinkable copolymer containing from 1% to 45% by weight of polymerized methylenecyclobutene and being an addition copolymer of 3-methylene-1-cyclobutene and another ethylenically unsaturated monomer having at least one terminal methylene group.

10. The process which comprises the steps of forming a shaped article of a crosslinkable addition copolymer of 3-methylene-1-cyclobutene and another ethylenically unsaturated monomer, said copolymer containing from 1% to 45% by weight of polymerized methylenecyclobutene, and then heating polymer to a temperature between 100° and 325° C. to form a crosslinked polymer product.

11. The process which comprises the steps of coating a surface with a crosslinkable addition copolymer of 3-methylene-1-cyclobutene and another unsaturated monomer, said copolymer containing from 1% to 45% by weight of polymerized methylenecyclobutene, and then heating the polymer to a temperature between 100° and 325° C. to crosslink the polymer.

12. The process which comprises the steps of printing on a surface with an ink containing a crosslinkable addition copolymer of 3-methylene-1-cyclobutene and another unsaturated monomer, said copolymer containing from 1% to 45% by weight of polymerized methylenecyclobutene, and then heating the polymer to a temperature between 100° and 325° C. to crosslink the polymer and set the ink.

13. The process which comprises the steps of bonding two surfaces with an adhesive containing a crosslinkable addition copolymer of 3-methylene-1-cyclobutene and another unsaturated monomer, said copolymer containing from 1% to 45% by weight of polymerized methylenecyclobutene, and then heating the polymer to a temperature between 100° and 325° C. to crosslink the polymer.

14. A crosslinked copolymer of 3-methylene-1-cyclobutene and another ethylenically unsaturated monomer, from 1% to 45% by weight of the copolymer being from the 3-methylene-1-cyclobutene.

15. A liquid coating composition comprising an addition copolymer of 3-methylene-1-cyclobutene with another ethylenically unsaturated monomer in a volatile solvent for the copolymer, said copolymer containing from 1% to 45% by weight of polymerized methylenecyclobutene.

16. A copolymer of 3-methylene-1-cyclobutene and ethylene containing from 1% to 45% by weight of polymerized methylenecyclobutene.

References Cited in the file of this patent

UNITED STATES PATENTS 2,462,347  Barrick _____ Sept. 12, 1947

OTHER REFERENCES

Chem. Abstract, 1948, vol. 42, p. 549c.